J. N. PEPIN.
SOUND BOX FOR PHONOGRAPHS.
APPLICATION FILED OCT. 23, 1918.
1,341,154. Patented May 25, 1920.
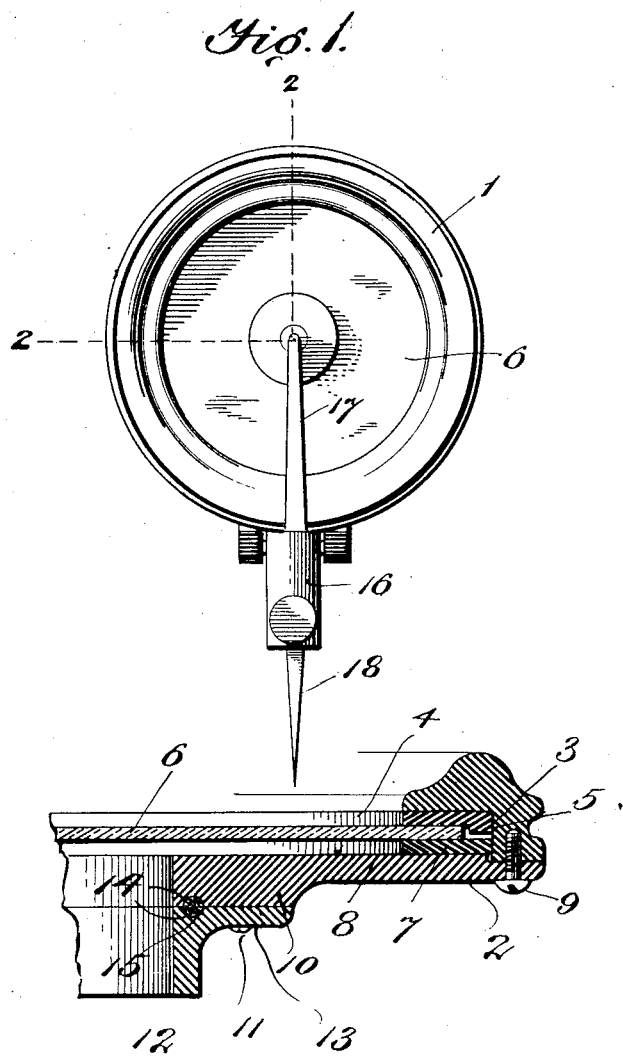
INVENTOR:
BY Jos. N. Pepin,
Duvall ATTORNEY.

UNITED STATES PATENT OFFICE.

JOSEPH N. PEPIN, OF CHICAGO, ILLINOIS.

SOUND-BOX FOR PHONOGRAPHS.

1,341,154.  Specification of Letters Patent.  Patented May 25, 1920.

Original application filed October 23, 1918, Serial No. 259,323. Divided and this application filed October 23, 1918. Serial No. 259,328.

*To all whom it may concern:*

Be it known that I, JOSEPH N. PEPIN, a citizen of the United States, residing at Chicago, in the county of Cook and State of Illinois, have invented new and useful Improvements in Sound-Boxes for Phonographs, of which the following is a specification.

This invention relates to improvements in sound-boxes for phonographs and is a divisional application based upon an invention disclosed by me in an application filed by me on the 23d day of October, 1918, Serial Number 259,323.

The invention relates principally to a form and arrangement of packing for containing the mica diaphragm within the sound-box, the object being to isolate the said diaphragm and support it securely between the two members of the sound-box so as to do away as much as possible with metallic sounds.

Other minor objects of the invention will hereinafter appear, and the novel features thereof will be more particularly pointed out in the claim.

Referring to the drawing—

Figure 1 is a facial elevation of a sound-box embodying my invention; and

Fig. 2 is a radial sectional view on the line 2—2 of Fig. 1, the said view being exaggerated to impart clearness of structure.

Similar numerals of reference indicate similar parts in all the figures of the drawing.

As is usual with the conventional type of sound-boxes, the same comprises the front and rear annular rings or members 1 and 2, respectively, and these, in the present instance are formed respectively with the shallow annular recess 3, and the raised face 8, the latter being designed to fit and slightly telescope within said recess.

The mica diaphragm is of the usual disk-like form, and in diameter is somewhat smaller than the recess 3 in the front ring or member.

The diaphragm is seated upon an annular rubber gasket 7, fitting within the recess 3 and mounted on the raised face 8 of the rear ring or member. By reason of the differences in diameter of the diaphragm and gasket 7, there is formed surrounding the gasket an annular recess.

The diaphragm is surmounted by a front annular gasket 4, also preferably made of rubber and of a diameter to fit within the recess 3. This gasket is provided with a peripheral flange 5, that extends rearward and is preferably of slightly less depth than the diaphragm although it may agree with the same, of preferred.

Screws 9, may be used to secure and clamp the rings or members 1 and 2 together and cause the raised face 8 of the rear ring or member to tightly bind the diaphragm between the two gaskets.

It will be seen that the annular flange of the front gasket 4 will become interposed between the edge of the diaphragm and the wall of the sound-box and that the two gaskets will impinge upon and clamp the diaphragm at opposite sides and prevent the diaphragm from contact with the rings or members 1 and 2.

As will be appreciated as the rubber gaskets harden and therefore shrink, any looseness may readily be taken up by the clamping- screws 9, the raised face of the rear ring or member readily following the gasket up into the shallow recess 3 of the front ring or member. By making the flange 5 of the front gasket 4 of slightly less thickness than the diaphragm a space is formed between the two gaskets, the space being gradually filled or closed as the two gaskets are brought together by a manipulation of the screws 9. It will also be apparent that the flange 5 being slightly narrower than the annular space formed between the diaphragm and the wall of the sound-box, all expansion is provided for, so that at all times the diaphragm lies perfectly flat, held clamped only at its perimeter, and is free to vibrate and transmit the sound-waves in a most accurate manner.

The coupling 12 forms no part of my invention, and may be varied to suit the type of sound-arm to which it is to be attached. In the present instance, it is formed with a flange 12, which, through screws 11, the coupling is attached to a hub or swell 10, formed at the rear side of the ring or member 2. In order that vibration may be reduced to a minimum the face of the swell or hub and the flange 13 may be formed with registering half-round grooves 14, into which a suitable annular fibrous packing 15, may be seated.

The stylus 17, needle-carrier 16, and the needle 18, are of the conventional type, form no part of my invention, and hence, require no detail description.

Having described my invention, what I claim, is:

In a sound-box or reproducer for talking-machines, the combination with front and rear rings or members and adjustable connecting-means, one of said rings or members being provided on its inner face with an annular recess, of a yielding annular gasket seated within said recess and provided with a marginal flange disposed away from the ring or member in which the gasket is seated and at an angle to the gasket, a flat diaphragm seated upon the gasket and surrounded by said marginal flange thereof and a companion gasket at the opposite side of the diaphragm, the latter gasket being spaced from the said marginal flange of the first mentioned gasket when these parts are clamped together to retain the diaphragm, whereby said marginal flange is not unduly spread or thickened to buckle or otherwise interfere with the said diaphragm.

In testimony whereof I have signed my name to this specification in the presence of two subscribing witnesses.

JOSEPH N. PEPIN.

Witnesses:
W. S. DUVALL,
ELEANOR E. HANDY.